Patented Nov. 26, 1935

2,022,439

UNITED STATES PATENT OFFICE 2,022,439

WELDING ROD

William Wetzel Sieg, Bellefonte, Pa.

No Drawing. Application June 18, 1934,
Serial No. 731,218

7 Claims. (Cl. 219—8)

My invention relates to welding rods and more particularly to rods that may be used for fusion welding or brazing of ferrous and non-ferrous metals and alloys having melting points above 1850 degrees Fahrenheit.

As well known the use of the so called bronze welding rods is limited because of the lack of wearing qualities and strength in the deposited metal, which is very porous, due to the large number of gas pockets and oxide inclusions in the deposited metal. Thus the temperature necessary to fuse the brazing material causes oxidation of some copper to a copper-copper oxide eutectic, which is brittle and destroys the ductility of the weld. The fusing temperature also causes the oxidation of the zinc to zinc oxide, which escapes in the form of obnoxious fumes during the welding process. Numerous attempts have been made to prevent or decrease the oxidation of the major ingredients of bronze welding rods, namely copper and zinc, by including more readily oxidizable metals, tending to reduce oxides and combine them with oxygen present in the rod, and furthermore to prevent the absorption of gases from the atmosphere. Thus aluminum, phosphorous, magnesium, silicon, manganese, boron and the alkalie metals have been used for deoxidizing purposes. However not all of these deoxidizers can be used to advantage due to the fact, that they impart undesirable characteristics to the deposited metal, such as hardness, loss of ductility and low bonding power.

One of the best known deoxidizers of those named above is silicon, which however forms silicides in the deposited metal and thereby materially decreases the ductility and the bond formed by the metal deposited between the surfaces to be joined. I have found that the formation of objectionable silicides and the consequent loss of ductility and bonding power can be avoided by adding iron, manganese, boron and tin to bronze welding rods. I have also found that the proportions of silicon, manganese and iron should be 2 to 2 to 1 and that the silicon content should be restricted to a maximum of 0.12%.

I have made rods containing:

|  | Minimum | Desired | Maximum |
|---|---|---|---|
| Copper | 58.00 | 58.75 | 59.50 |
| Silicon | .02 | .10 | .12 |
| Manganese | .02 | .10 | .12 |
| Iron | .01 | .05 | .20 |
| Boron | .0005 | .005 | .05 |
| Tin | .05 | .05 | .10 |
| Zinc, balance | 41.8995 | 40.945 | 39.91 | and have determined by photomicrography that welding rods composed of the metals disclosed in the above table do not show an inter-metallic silicon constituent super-imposed upon a field of alpha and beta crystals as normally present in bronze welding rods containing a silicon deoxidizer.

The absence of this silicon constituent of course increases the ductility and insures a better bonding than previously obtained, as will best be seen from the following table. This table gives the constituents of two bronze welding rods having approximately the same silicon content. No. 1 is a commercial rod on the market (not claimed herein) and No. 2 illustrates the present invention.

|  | No. 1 | No. 2 |
|---|---|---|
| Copper | 59.14 | 58.78 |
| Silicon | .12 | .09 |
| Manganese | .00 | .10 |
| Iron | .98 | .045 |
| Boron | .00 | .006 |
| Tin | .00 | .06 |
| Zinc | Balance | Balance |

The deposited metal of a weld made from a welding rod comprising the elements described in the No. 1 table (below) includes the objectionable metallic silicon constituent above referred to whereas the metal deposited from a welding rod of the No. 2 table is free from said constituent.

The differences in physical properties between the two rods, will be clear from the following tables.

|  | No. 1 | No. 2 |
|---|---|---|
| Yield | 34,000 | 35,575 |
| Tensile strength | 42,725 | 56,340 |
| Elongation | 8.59% | 16.40% |

The silicon provides a readily oxidizable metal which reduces the oxides present and prevents others from being formed during the welding process.

The boron having a greater affinity for oxygen than the silicon, acts as a deoxidizer and degasifier to eliminate occluded gases from the deposited molten metal. Boron reacts with iron, manganese, tin and silicon and forms borides, thus preventing the formation of silicides between the silicon and these elements, because boron will not readily react with copper. The iron, tin and manganese are used to carry the boron.

Having thus described my invention:

What I claim is:

1. A welding rod consisting predominately of copper and zinc and containing silicon .02% to .12%, manganese .02% to .12%, iron .01% to .05%, boron .0005% to .05% and tin .05% to .10%, the copper content falling within the range 58.00% to 59.50%, and the zinc content forming the balance, and the silicon, manganese and iron being in about the proportion of 2:2:1.

2. A welding rod consisting predominately of copper and zinc and containing boron .0005% to .05%, tin .05% to .10%, silicon manganese and iron collectively from .05% to .44% with, the proportion of the silicon, the manganese and iron being in all cases approximately: silicon 2 parts, manganese 2 parts, and iron 1 part, wherein the copper content is approximately 58.00% to 59.50%, and wherein the zinc content forms the balance.

3. A welding rod composed of an alloy containing about 58 to 59.5% of copper, about 0.1% silicon, about 0.1% manganese, about .05% iron, about .005% boron, about .05% tin, the balance being substantially all composed of zinc.

4. A welding rod composed of an alloy in which well over 99% is composed of copper and zinc, the former predominating, and containing smaller but influential amounts of silicon, manganese, iron, boron and tin, and in which the silicon, manganese and iron are in about the proportion 2:2:1.

5. A welding rod composed of an alloy in which well over 99% is composed of copper and zinc, the former predominating, and containing smaller but influential amounts of silicon, manganese, iron, and in which the silicon, manganese and iron are in about the proportion 2:2:1.

6. A welding rod consisting of an alloy of copper, zinc, silicon, managese, iron, boron and tin, the copper and zinc collectively amounting to over 99% of said alloy, and the three elements silicon, manganese and iron together amounting to a major proportion of all of the alloy other than copper and zinc present therein, and these three elements being present in about the proportions 2:2:1, respectively, in the order stated.

7. A composition as in claim 6, in which the boron is in a non-oxidized state and amounts to about 0.005% of the entire alloy.

WILLIAM WETZEL SIEG.